United States Patent [19]

King, Jr. et al.

[11] Patent Number: 5,412,061
[45] Date of Patent: May 2, 1995

US005412061A

[54] POLYCARBONATE MELT CONDENSATION SYNTHESIS USING A TETRAORGANOPHOSPHONIUM CARBOXYLATE SALT CATALYST

[75] Inventors: Joseph A. King, Jr., Schenectady; Patrick J. McCloskey, Watervliet, both of N.Y.

[73] Assignee: General Electric Company, Schenectady, N.Y.

[21] Appl. No.: 206,692

[22] Filed: Mar. 7, 1994

[51] Int. Cl.$^6$ ............................................... C08G 64/00
[52] U.S. Cl. ..................................... 528/198; 528/196
[58] Field of Search ................................. 528/196, 198

[56] References Cited

U.S. PATENT DOCUMENTS

| | | | |
|---|---|---|---|
| 4,766,184 | 8/1988 | Hefner, Jr. | 525/463 |
| 5,037,903 | 8/1991 | Parker | 525/438 |

OTHER PUBLICATIONS

Article–DF Fox, In "Kirk–Othmer Encyclopedia of Chemical Technology", 3rd Ed.; HF Mark, et zl. New York, 1982, vol. 18, pp. 479–494.
Article–Linear Aromatic Polyesters of Carbonic Acid, H. Schnell–Ind. & Eng. Ehcm. 51, 157 (1959) (4 pages).

Primary Examiner—John Kight, III
Assistant Examiner—Terressa Mosley
Attorney, Agent, or Firm—William A. Teoli; William H. Pittman

[57] ABSTRACT

The present invention is directed to a method of making polycarbonates by the melt condensation of diarylcarbonate and dihydric phenol in the presence of a tetraorganophosphonium carboxylate salt, such as tetrabutylphosphonium acetate.

6 Claims, No Drawings

POLYCARBONATE MELT CONDENSATION SYNTHESIS USING A TETRAORGANOPHOSPHONIUM CARBOXYLATE SALT CATALYST

CROSS REFERENCE TO RELATED APPLICATION

Reference is made to copending application Ser. No., 08/071,141, filed May 27, 1993.

BACKGROUND OF THE INVENTION

The present invention relates to a method for making polycarbonates by the melt condensation of a diarylcarbonate and an aromatic bis hydroxy compound. More particularly, the present invention relates to the use of a tetraorganophosphonium carboxylate salt, such as tetrabutylphosphonium acetate, as a catalyst, to initiate rapid carbonate transesterification.

Methods for making polycarbonate by a solventless melt condensation reaction between diphenyl carbonate and bisphenol A are shown by Sakashita et al, U.S. Pat. No. 5,026,817. In one procedure, Sakashita et al use reactants having a particular range of hydrolyzable chlorine. In another method, a mixed catalyst is used, such as a nitrogen containing basic compound and an aromatic hydroxy salt of an alkali metal or alkaline earth metal. It has been found, however, that during such melt polymerization reactions, nitrogen containing basic compounds, such as tetramethylammonium hydroxide, can decompose to produce a variety of products including amines which can contaminate the final polymer. As a result of said decomposition, a second catalyst, such as sodium hydroxide is often employed as a finishing catalyst.

A further method for making polycarbonates by melt transesterification of diphenyl carbonate with 2,2-bis(4-hydroxyphenyl)propane is shown by Yangsoo Kim et al, Industrial Engineering Chemistry Research, 1992, 31, 2118–2127. Yangsoo Kim et al employ a lithium hydroxide catalyst.

Although alkali metal hydroxides have been found effective either as a finishing catalyst or as a condensation catalyst, these materials are carried into the final resin which can be adversely affected.

Volatile basic catalysts, such as organic nitrogen compounds, for example organic amines, also have been evaluated as condensation catalysts. Although such organic compounds can be readily removed from the polycarbonate resin at the termination of the condensation reaction, color bodies are often generated. In addition, even trace amounts of amines have been found to have a deleterious affect on the long term stability of the polymer. It would be desirable therefore, to provide organic compounds useful as catalysts for effecting the condensation between a diaryl carbonate and an aromatic bis hydroxy compound under melt conditions which are readily removable or which do not adversely affect the resulting polycarbonate resin.

SUMMARY OF THE INVENTION

The present invention is based on the discovery that an effective amount of a tetraorganophosphonium carboxylic acid salt, such as tetrabutylphosphonium acetate, is capable of initiating a rapid carbonate transesterification reaction when utilized in a melt condensation of a diarylcarbonate and a bisphenol. In addition, unlike quaternary ammonium salts, the tetraorganophosphonium carboxylic acid salts used in the practice of the invention do not generate a basic residue like an amine which can have a pronounced deleterious effect if left in the final polycarbonate resin. Further, the use of a tetraorganophosphonium carboxylic acid salt also eliminates the requirement of additional alkali metal salt, such as sodium or lithium hydroxide.

STATEMENT OF THE INVENTION

There is provided by the present invention, a method for making polycarbonate comprising, (1) effecting reaction between a diaryl carbonate and an aromatic bis hydroxy compound in the presence of an effective amount of a tetraorganophosphonium carboxylic acid salt and, (2) distilling an aromatic hydroxy compound from the resulting mixture of (1) at a temperature in the range of about 150° C. to about 350° C.

Among the tetraorganophosphonium carboxylic acid salts, or mixtures thereof, which can be used as catalysts in the practice of the invention, there are included:
tetramethylphosphonium acetate
tetraethylphosphonium acetate
tetrapropylphosphonium acetate
tetrabutylphosphonium acetate
tetrapentylphosphonium acetate
tetrahexylphosphonium acetate
tetraheptylphosphonium acetate
tetraoctylphosphonium acetate
tetradecylphosphonium acetate
tetradodecylphosphonium acetate
tetratolylphosphonium acetate
tetraphenylphosphonium acetate
tetramethylphosphonium benzoate
tetraethylphosphonium benzoate
tetrapropylphosphonium benzoate
tetraphenylphosphonium benzoate
tetramethylphosphonium formate
tetraethylphosphonium formate
tetrapropylphosphonium formate
tetraphenylphosphonium formate
tetramethylphosphonium propionate
tetraethylphosphonium propionate
tetrapropylphosphonium propionate
tetramethylphosphonium butyrate
tetraethylphosphonium butyrate, and
tetrapropylphosphonium butyrate.

Diaryl carbonates which can be employed in the practice of the present invention are for example, diphenyl carbonate, di-(halophenyl)carbonates, such as di-(chlorophenyl)carbonate, di-(bromophenyl)carbonate; di-(alkylphenyl)carbonate, such as di(tolyl)carbonate, di-(ethylphenyl)carbonate, di(cumyl)carbonate; di-(nitrophenyl)carbonate, or mixtures thereof. Preferably, diphenyl carbonate is used.

Among the aromatic bis hydroxy compounds which can be used in the practice of the present invention are the following compounds:
resorcinol
4-bromoresorcinol
hydroquinone
4,4'-dihydroxybiphenyl
1,6-dihydroxynaphthalene
2,6-dihydroxynaphthalene
bis(4-hydroxyphenyl)methane
bis(4-hydroxyphenyl)diphenylmethane
bis(4-hydroxyphenyl)-1-naphthylmethane 1,1-bis(4-hydroxyphenyl)ethane
1,2-bis(4-hydroxyphenyl)ethane
1,1-bis(4-hydroxyphenyl)-1-phenylethane
2,2-bis(4-hydroxyphenyl)propane("bisphenol A")
2-(4-hydroxyphenyl)-2-)3-hydroxyphenyl)propane
2,2-bis(4 -hydroxyphenyl)butane
1,1-bis(4-hydroxyphenyl)isobutane
1,1-bis(4-hydroxyphenyl)cyclohexane
1,1-bis(4 -hydroxyphenyl)cyclododecane
trans-2,3-bis(4-hydroxyphenyl)-2-butene
2,2-bis(4-hydroxyphenyl)adamantane
α,α'-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane
2,2-bis(3-isopropyl-4-hydroxyphenyl)propane
2,2-bis(3-sec-butyl-4-hydroxyphenyl)propane
2,2-bis(3-t-butyl-4-hydroxyphenyl)propane
2,2-bis(3-cyclohexyl-4-hydroxyphenyl)propane
2,2-bis(3-allyl-4-hydroxyphenyl)propane
2,2-bis(3-methoxy-4-hydroxyphenyl)propane
2,2-bis(3,5-dimethyl-4-hydroxyphenyl)propane
2,2-bis (2,3,5,6-tetramethyl-4-hydroxyphenyl)propane
2,2-bis(3-5-dichloro-4-hydroxyphenyl)propane
2,2-bis(3,5-dibromo-4-hydroxyphenyl)propane
2,2-bis(2,6-dibromo-3,5-dimethyl-4-hydroxyphenyl)-propane
αα-bis(4 -hydroxyphenyl)toluene
ααα',α'-Tetramethyl-αα'-bis(4-hydroxyphenyl-p-xylene
2,2-bis(4-hydroxyphenyl)hexafluoropropane
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-dihydroxybenzophenone
3,3-bis(4-hydroxyphenyl)-2-butanone
1,6-bis(4-hydroxyphenyl)-1,6-hexanedione ethylene glycol bis(4-hydroxyphenyl)ether
bis(4-hydroxyphenyl)ether
bis(4-hydroxyphenyl)sulfide
bis(4-hydroxyphenyl)sulfoxide
bis(4-hydroxyphenyl)sulfone
bis(3,5-dimethyl-4-hydroxyphenyl)sulfone
9,9-bis(4-hydroxyphenyl)fluorene
2,7-dihydroxypyrene
6,6-dihydroxy-3,3,3',3'-tetramethylspiro(bis)indane("-spirobiindane bisphenol")
3,3-bis(4-hydroxyphenyl)phthalide
2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene, and
2,7-dihydroxycarbazole.

In the practice of the invention, a substantially equal molar mixture of the diaryl carbonate and the aromatic bis hydroxy compound is heated at atmospheric pressures in a substantially inert atmosphere at temperatures in the range of from 150° C. to 210° C. Agitation of the mixture can be initiated as soon as the components start to melt. The system can be agitated slowly to promote better heat exchange. After the system has been allowed to thermally equilibrate, an effective amount of the tetraorganophosphonium carboxylic acid salt, or "phosphonium catalyst" can be added. An effective amount of the phosphonium catalyst is from $1 \times 10^{-1}$ to $1 \times 10^{-5}$ parts by weight of catalyst, per 100 parts by weight of condensation mixture.

The resulting solution can be stirred until the phosphonium catalyst has been dispersed and the reaction temperature of the mixture can be raised to 180° C. to 210° C. while the pressure can be lowered to 175 to 250 torr. Distillation of aromatic hydroxy compound can be effected and the pressure continuously reduced to further effect the separation of the aromatic hydroxy compound. The pressure of the reaction can be further reduced to 70 to 130 torr while the temperature can be increased to 220° C. to 250° C. The final stage of the reaction can be initiated by placing the condensation product under full vacuum at 0.1 to 5 torr at a temperature in the range of from 270° C. to 350° C. for 0.5 to 3 hours. Recovery of the final polycarbonate can be achieved after the theoretical amount of aromatic hydroxy compound has been collected.

In order that those skilled in the art will be better able to practice the present invention, the following examples are given by way of illustration and not by way of limitation. All parts are by weight unless otherwise indicated. The tetraorganophosphonium carboxylic salt catalysts (all monohydrates), were prepared from the corresponding tetraarylphosphonium or tetraalkylphosphonium chloride or bromide (Aldrich Chemical Co.) using silver acetate or silver benzoate.

EXAMPLE 1

There were added as powders, 136.9 g (0.600 mol) of bisphenol A (BPA) and 138.9 g (0.648 mol) of diphenyl carbonate (DPC) into a liter melt polymerizer apparatus. The reactor vessel was deoxygenated by evacuating it to about 1 torr and then the apparatus was refilled with nitrogen. The deoxygenation procedure was repeated three times. The reactor vessel was immersed in a fluidized heat bath preheated to 180° C. The DPC/BPA mixture was allowed to melt, producing a colorless, homogeneous liquid. As soon as a small amount of the mixture melted, the mixture was stirred slowly to promote better heat exchange. The mixture was then allowed to thermally equilibrate for 5–10 minutes.

The mixture was stirred at 250 rpm. There was then syringed into the mixture, 9.7 mg ($3.05 \times 10^{-5}$ mol) of tetrabutylphosphonium acetate monohydrate dissolved in 0.1 mol of tetrahydrofuran (THF). The resulting solution was stirred for 5 min at 180° C. At this time, the reaction temperature was raised to 210° C. and the pressure lowered to 175 torr (175 mm Hg). After a couple of minutes, phenol began to distill out of the reactor vessel into an evacuated receiver flask (2 drops/sec). After 35 min, the reactor pressure was lowered to 100 torr and held there for another 35 min. Phenol continued to distill into the receiver flask (2 drop/sec). The reactor pressure was lowered to 15 torr while the temperature was raised to 240° C. for a period of 40 min. The mixture started to foam 6 min after the temperature reached 270° C., and continued to foam for 8 min. The final stage of the reaction was initiated by placing the melted material under full vacuum (0.9 torr) at 300° C. for 1.5 hr. The viscosity started to build immediately after the foaming ceased. The mass of distillate collected in the overheads was 121.7 g (theoretical=123.4 g). There was obtained a colorless polycarbonate having an IV-$_{chloroform}=0.492$ dl/g. $M_w=42,931$, $M_n=16,768$, $M_z=70,095$, $M_w/M_n=2.560$ and the OH wt % (end-group)=0.1580 wt %.

EXAMPLE 2

In accordance with the procedure of example 1, an evaluation of several carbonate transesterification catalysts was made to determine the effectiveness of the catalysts with respect to the rate of phenol exchange.

A 500 ml quartz melt polymerization apparatus was charged with 25 g (0.0592 mol) of di- [p-2,4,4-trimethylpentyl)phenyl] carbonate and 25.2 g (0.1184 mol) of p-cumylphenol. The mixture was purged with nitrogen and heated to 220° C. When the solids had completely melted, the solution was stirred for two minutes and polymerization catalyst was added as an aqueous solution; the catalyst was used in an amount sufficient to provide a molar ratio of 0.001 mole of catalyst per mole of carbonate in the mixture. The following results were obtained where k is a reaction rate constant:

| Catalyst | k (relative) |
| --- | --- |
| tetraethylammonium hydroxide | 3.25 |
| sodium hydroxide | 3.20 |
| Tetraethylphosphonium acetate | 2.11 |
| Tetraethylammonium phenoxide | 1.31 |
| sodium phenoxide | 1.00 |
| Tetrabutylphosphonium benzoate | 0.63 |
| Tetraethylammonium acetate | 0.40 |
| Tetrabutylphosphonium acetate | 0.19 |
| tetraethylammonium tosylate | negligible |

The above results show that the catalytic activity of tetraalkylphosphonium salts is substantially similar to the corresponding alkali metal or ammonium salts.

EXAMPLE 3

In accordance with the procedure of example 1, 136.9 g (0.600 mol) of BPA and 138.9 g (0.648 mol) of DPC were added into a one liter glass melt polymerization reactor as powders along with 0.1964 g ($4.52\times10^{-4}$ mol) crystalline tetraphenylphosphonium acetate. The reactor vessel was deoxygenated by evacuation to about 1 torr and then refilling the vessel with purified nitrogen. This deoxygenation procedure was repeated a total of three times. The reactor vessel was immersed in a fluidized heat bath preheated to 180° C. The reaction mixture was allowed to melt, producing a colorless, homogeneous liquid. Upon complete solution, the system was allowed to thermally equilibrate (5–10 min). The solution was stirred at 250 rpm. At this time the reaction temperature was raised to 210° C. and the pressure lowered to 175 mm Hg. Phenol began to distill from the reactor immediately (approx. 3–4 drops/sec.). After 35 minutes, the reactor pressure was lowered to 100 mm Hg and held there for an additional 35 minutes. Phenol continued to distill into the receiver flask (2 drops/sec) during this time and a total volume of 68 mL was collected by the end of 210° C. stage. The reactor temperature was raised to 240° C. (15 torr) and these conditions maintained for 40 minutes. During this time period, phenol distilled at an average rate of about 1 drop/3–5 sec (a total of 105 mL were colledted to this point). The reaction temperature was raised to 270° C. (2 torr) for 20 minutes and then raised to 300° C. (0.75 torr) for 65 minutes. The reaction was terminated at this point. A total of 122.1 grams of distillate was collected during the course of the reaction. A colorless, high molecular weight polycarbonate was collected yielding the following analytical data: $IV_{chloroform}=0.567$, $M_w=53,447$, $M_n=18,256$, $M_w/M_n=2.928$, $M_z=103,907$, and OH=0.120 wt. %.

EXAMPLE 4

The procedure of example 1 was repeated except that there was used, 60.2 mg ($5.9\times10^{-6}$ mol) of tetrabutylphosphonium benzoate, per 138.9 g of diphenyl carbonate and 136.9 g of bisphenol A. There was obtained 122.6 g of polycarbonate $M_w=41,330$, $M_n=17,597$, $M_w/M_n=2.349$, $M_z=66,561$, and the OH % (end-group)=0.1527 wt. %.

Although the above examples are directed to only a few of the very many variables of the present invention, it should be understood that the present invention also includes the additional phosphonium catalysts and reactants as shown in the description preceding these examples.

What is claimed is:

1. A method for making polycarbonate comprising,
   (1) effecting the melt condensation of diaryl carbonate and aromatic bis hydroxy compound in the presence of $1\times10^{-5}$ part to $1\times10^{-1}$ part by weight, of a tetraorganophosphonium carboxylic acid salt per 100 parts by weight of condensation mixture and,
   (2) distilling aromatic hydroxy compound from the resulting mixture of (1) at a temperature in the range of about 150° C. to about 350° C.

2. A method in accordance with claim 1, where the diaryl carbonate is diphenyl carbonate.

3. A method in accordance with claim 1, where the aromatic bis hydroxy compound is bisphenol A.

4. A method in accordance with claim 1, where the tetraorganophosphonium carboxylic acid salt is tetrabutylphosphonium acetate.

5. A method in accordance with claim 1, where the tetraorganophosphonium carboxylic acid salt is tetrabutylphosphonium benzoate.

6. A method in accordance with claim 1, where the tetraorganophosphonium carboxylic acid salt is tetraphenylphosphonium acetate.

* * * * *